W. W. DEAN.
IGNITION GENERATOR.
APPLICATION FILED AUG. 22, 1916.

1,379,334.

Patented May 24, 1921.
2 SHEETS—SHEET 2.

UNITED STATES PATENT OFFICE.

WILLIAM WARREN DEAN, OF STAMFORD, CONNECTICUT, ASSIGNOR TO SPLITDORF ELECTRICAL COMPANY, OF NEWARK, NEW JERSEY, A CORPORATION OF NEW JERSEY.

IGNITION-GENERATOR.

1,379,334.　　　　　Specification of Letters Patent.　　Patented May 24, 1921.

Application filed August 22, 1916. Serial No. 116,356.

*To all whom it may concern:*

Be it known that I, WILLIAM W. DEAN, a citizen of the United States, residing at Stamford, in the county of Fairfield and State of Connecticut, have invented certain new and useful Improvements in Ignition-Generators, of which the following is a specification, reference being had to the accompanying drawing.

The invention relates to new and useful improvements in generators used for ignition purposes and generally termed magnetos and also to that class of generators which are often used for both ignition and lighting.

An object of the invention is to provide a magneto of the above type wherein the current generating coils are stationary and the cores of the coils are disposed adjacent the path of rotation of the ends of spaced prongs forming the poles of a permanent magnet rotor and form the pole pieces of the respective coils.

A further object of the invention is to provide a magneto of the above type wherein the coils and cores are disposed wholly at one side of the movable poles of the rotor.

A still further object of the invention is to provide a magneto of the above type wherein the cores forming the pole pieces are capable of angular adjustment about the axis of the rotor for timing purposes.

A still further object of the invention is to provide a magneto of the above construction with means for adjusting the relative position of the cores and the rotor for varying the clearance or the size of the air gap.

These and other objects will in part be obvious and will in part be hereinafter more fully disclosed.

In the drawings:—

Figure 1:
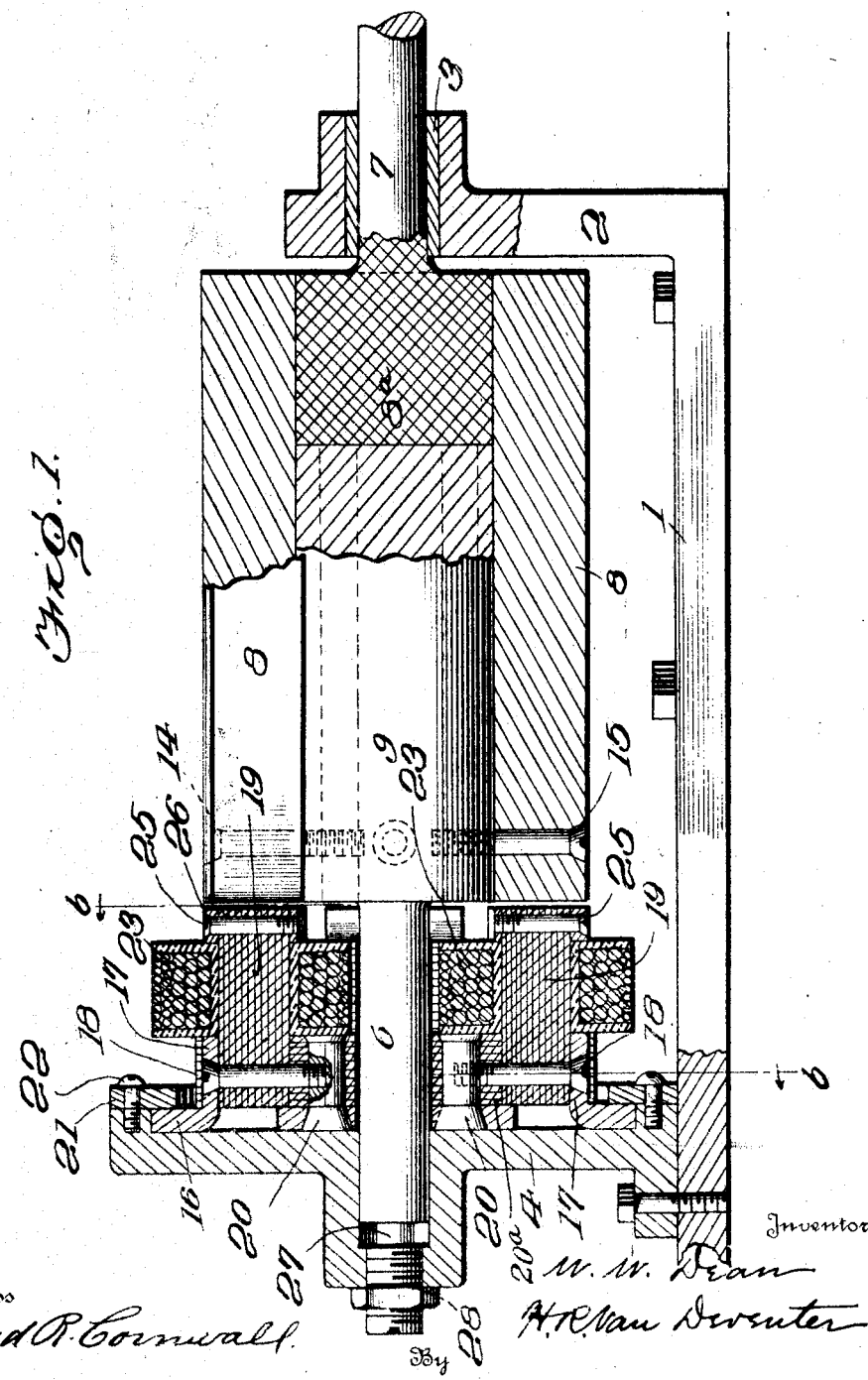
Figure 1 is a vertical and longitudinal view through a magneto having my improvements embodied therein.
Figure 2:
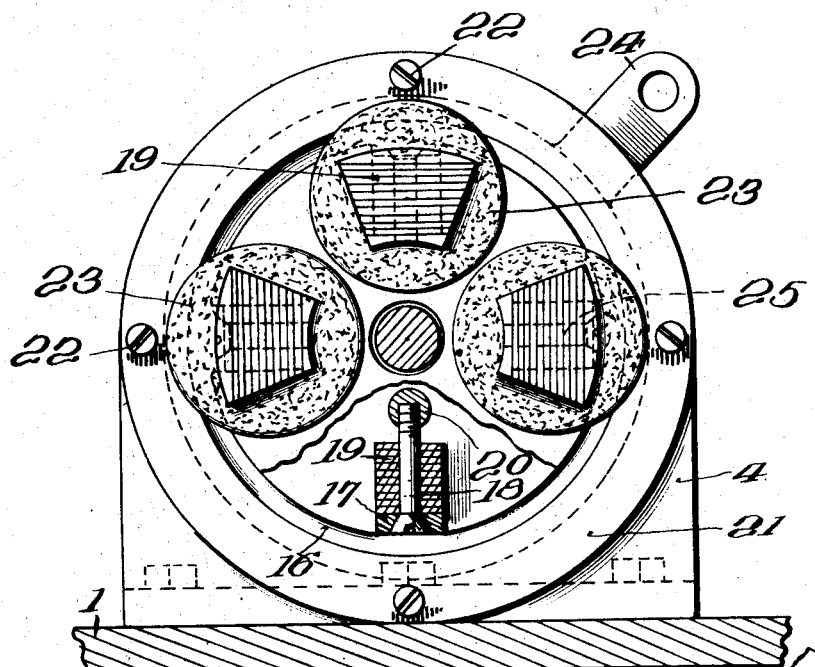
Fig. 2 is a view partly in section and partly in end elevation on the lines *b—b* of Fig. 1.

The invention consists broadly of a generator or magneto having a suitable base formed, preferably, of cast iron and having a standard formed integral therewith and carrying one of the bearings for the rotor. At the other end of the base there is a standard formed of non-magnetic material which serves for the other bearing for the rotor. The rotor is in the form of a permanent magnet having spaced prongs, the ends of which form the poles of the magnet and these prongs are parallel with the axis of the rotor. This rotor may either oscillate or rotate. Carried by the non-magnetic standard is an adjustable plate to which are fastened cores formed of laminations. These cores are disposed angularly about the axis of the rotor so as to correspond in number and angular position to the poles of the magnet forming the rotor. The ends of the cores are adjacent the path of travel of the poles of the rotor and form the pole pieces for the respective current generating coils which are carried by the cores. The rotor may be adjusted endwise of its axis so as to vary the position of the ends of the prongs of the magnet relative to the ends of the cores forming the pole pieces thus varying the air gap. The plates supporting the cores may be adjusted angularly about the axis of the rotor for timing purposes.

Referring more in detail to the drawings, my improved generator consists of a supporting base 1 which is preferably of cast iron. At one side of this base there is an upright plate or standard 2 which is formed integral with the base. This end plate 2 carries a bronze bushing 3 which forms one of the bearings for the rotor. Secured to the other end of the base is an upright end plate or standard 4 which is of non-magnetic material, and this end plate forms the other bearing for the rotor. Supported in the end plates 2 and 4 is the rotor which is adapted to be rotated or oscillated as desired. This rotor consists of a permanent magnet 5 having supporting shafts 6 and 7.

As shown in Fig. 1 of the drawings, the permanent magnet consists of a number of bar magnets 8, each of which is secured at one end to a magnetic block 8ª. The shaft 7 may be attached to this magnetic block 8ª in any suitable manner. The other ends of these bar magnets are secured to a non-magnetic block 9 and the shaft 6 may be formed in one piece with block 9 or suitably attached thereto. The shafts 6 and 7 really form one shaft and will be so referred to hereinafter.

Figure 3:
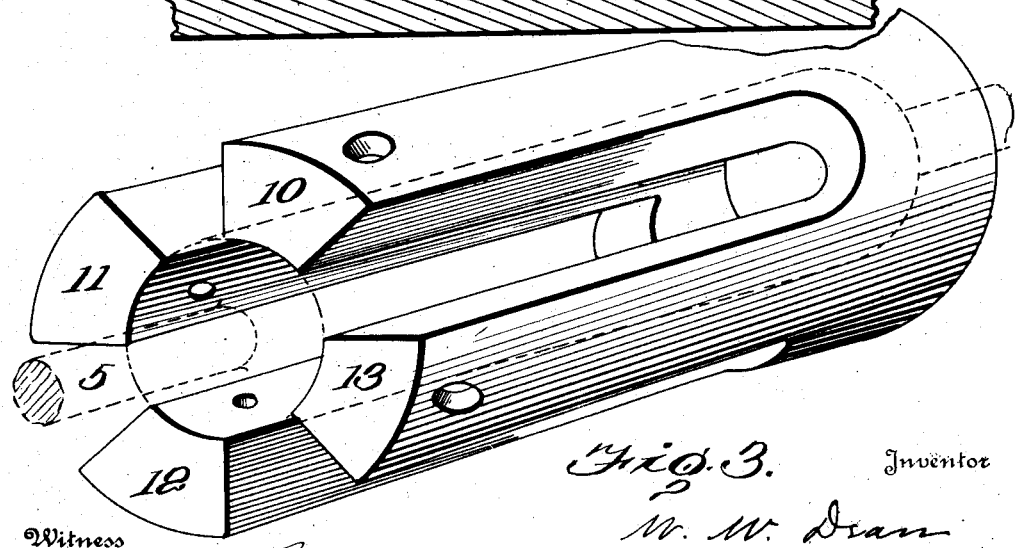
Fig. 3 is a perspective view showing a slightly modified form of rotor.

In Fig. 3 of the drawing, I have shown a slightly modified form of rotor wherein the magnet is made of one piece of tubular steel having cutaway portions forming the prongs 10, 11, 12 and 13. These prongs are shaped to correspond to the bar magnets 8 shown in Fig. 1, and the magnet is supported on shafts 6 and 7 in any suitable way. The bar magnet 8 and also the prongs 10, 11, 12 and 13 are secured to the non-magnetic block 9 by means of suitable bolts, two of which are shown at 14 and 15, in Fig. 1 of the drawings.

The end plate 4 has an annular recess on its inner face in which is mounted a stamped ring 16. Ears 17 are punched out of this stamped ring and these ears support screws 18 on each of which is mounted a group of laminations 19 forming the cores for the current generating coils 23. These cores are connected by laminations indicated at 20ª in the drawings. The inner ends of the screws 18 enter pins 20 which are riveted into the plate 16. Overlying this plate 16 and holding the same in the annular recess of the end plate 4 is a ring 21 which is secured to the plate 4 by means of screws 22. This overlying ring holds the plate 16 firmly in position but allows the same to be turned. As the cores and the coils are mounted on this plate 16 they will turn with the plate and this affords a means whereby the cores and coils may be angularly adjusted about the axis of the rotor. This adjustment is used for timing purposes in a manner well known in this art.

A suitable handle 24 is attached to the plate 16 and projects outwardly from the machine so as to be engaged by the timing mechanism or rod commonly employed. The coils 23 are held on the ends of the cores 19 by means of screws 25 which also serve to secure the laminations at the polar extremities of the cores together.

It will be apparent from the above description and the figures of the drawings that the cores are the same in number as the prongs of the magnet forming the rotor and these cores are angularly spaced about the axis of the rotor to correspond to the angular spacing of the prongs forming the poles of the magnet. It will furthermore be apparent that these cores form the pole pieces which receive the flux for the current generating coils. These cores are disposed wholly at one side of the path of rotation of the ends of the prongs and are in line with the prongs when they are opposite same. The cores are slightly spaced from the ends of the prongs of the magnet thus forming an air gap 26. In order that this air gap may be properly adjusted to facilitate assembling the parts and also to compensate for wear in service, I provide the end plate 4 with a screw 27 which bears against the end of the shaft 6 and a clamp nut 28 locks the screw in the adjusted position. By turning the screw 27 the rotor may be shifted endwise of its axis and the air gap thus adjusted. The magnetic pull between the rotor magnet and the coil cores tends to hold the rotor shaft 6 against the end of the screw 27.

It will be understood that any suitable mechanism may be employed for taking the current generated in the coils and I have, therefore, neither shown nor described such mechanism. It will also be understood that certain of the coils may be used for ignition purposes while others are used for lighting or for other purposes.

While I have shown the cores or the current generating coils disposed at the ends of the prongs forming the poles of the magneto, it will be understood that the cores and coils may be otherwise disposed, the essential feature of the invention consisting in the multipolar magnet having its prongs which form the poles parallel with the axis of the rotor and the plurality of the generating coils having their cores so shaped and disposed as to form the pole pieces which receive flux from the poles of the magnet for the current generating coils.

It will also be obvious that minor changes in the details of construction and arrangement of parts may be made without departing from the spirit of the invention as set forth in the appended claims.

Having thus described my invention, what I claim as new and desire to secure by Letters Patent, is:—

1. A magneto electric machine comprising a multipolar permanent magnet rotor having a plurality of spaced prongs forming the poles of the magnet, said prongs being parallel to the axis of the rotor, a non-magnetic block connecting the outer ends of said prongs, a shaft supporting said prongs for rotation, a supporting base, an upright formed integral therewith and having a bearing for said shaft, a non-magnetic upright mounted on said base and forming the other bearing for said shaft, a plurality of stationary current-generating coils carried by said non-magnetic upright, a core for each coil, said cores being disposed endwise of and in inductive relation to the poles of the magnet and adapted to receive the flux therefrom, means carried by said non-magnetic upright for adjusting the shaft endwise to vary the air gap between the poles of the magnet and the ends of the cores.

2. A magneto electric machine comprising a multipolar permanent magnet rotor having a plurality of spaced prongs magnetically connected at their inner ends, a non-magnetic block connecting the outer ends of said prongs, and a shaft supporting said prongs for rotation or oscillation about an axis parallel with the prongs, a supporting base, an upright formed integral therewith and having a bearing for said shaft, a non-magnetic upright mounted on said base and forming the other bearing for said shaft, an adjustable ring mounted on said non-magnetic upright, a plurality of cores carried by said ring, and a current generating coil for each core, said cores being disposed adjacent the path of travel of the ends of the prongs and serving as pole pieces for their respective coils.

3. A magneto electric machine comprising a multipolar permanent magnet rotor having a plurality of spaced prongs magnetically connected at their inner ends, a non-magnetic block connecting the outer ends of said prongs, and a shaft supporting said prongs for rotation or oscillation about an axis parallel with the prongs, a supporting base, an upright formed integral therewith and having a bearing for said shaft, a non-magnetic upright mounted on said base and forming the other bearing for said shaft, an adjustable ring mounted on said non-magnetic upright, a plurality of cores carried by said ring, and a current generating coil for each core, said cores being disposed adjacent the path of travel of the ends of the prongs and serving as pole pieces for their respective coils, and means whereby said ring may be adjusted for shifting the angular position of the cores about the axis of the rotor.

4. A magneto electric machine comprising a multipolar permanent magnet rotor having a plurality of spaced prongs magnetically connected at their inner ends, a non-magnetic block connecting the outer ends of said prongs and a shaft supporting said prongs for rotation or oscillation about an axis parallel with the prongs, a supporting base, uprights carried by said supporting base and having bearings for said shaft, one of said uprights being formed of non-magnetic material and having a recess therein, a ring mounted in said recess, means for holding the ring in the recess whereby the ring may be oscillated in said recess, means for oscillating said ring, a plurality of cores carried by said ring, each core consisting of a group of laminations and a current generating coil on each core, the ends of said cores being disposed adjacent the path of travel of the ends of the prongs and serving as pole pieces for their respective coils.

5. A magneto electric machine comprising a multipolar permanent magnet rotor having a plurality of spaced prongs magnetically connected at their inner ends, a non-magnetic block connecting the outer ends of said prongs and a shaft supporting said prongs for rotation or oscillation about an axis parallel with the prongs, a supporting base, uprights carried by said supporting base and having bearings for said shaft, one of said uprights being formed of non-magnetic material and having a recess therein, a ring mounted in said recess, means for holding the ring in the recess whereby the ring may be oscillated in said recess, means for oscillating said ring, a plurality of cores carried by said ring, each core consisting of a group of laminations and a current generating coil on each core, the ends of said cores being disposed adjacent the path of travel of the ends of the prongs and serving as pole pieces for their respective coils, and means carried by said non-magnetic upright for adjusting the shaft of the rotor endwise for varying the air gap between the ends of the prongs of the magnet and the ends of said cores.

6. A magneto electric machine comprising a multipolar permanent magnet rotor having a plurality of spaced prongs magnetically connected at their inner ends, a non-magnetic block connecting the outer ends of said prongs and a shaft supporting said prongs for rotation or oscillation about an axis parallel with the prongs, a supporting base, uprights carried by said supporting base and having bearings for said shaft, one of said uprights being formed of non-magnetic material and having a recess in the ends thereof, a ring mounted in said recess, means for holding the ring in the recess whereby the ring may be oscillated in said recess, means for oscillating said ring, a plurality of cores carried by said ring, each core consisting of a group of laminations and a current generating coil on each core, the ends of said cores being disposed adjacent the path of travel of the ends of the prongs and serving as pole pieces for their respective coils, and an adjusting screw carried by the non-magnetic upright for shifting said shaft endwise for varying the air gap between the ends of the prongs and the ends of said cores.

7. A magneto electric machine comprising a supporting base, uprights carried by said base, one of said uprights being of non-magnetic material, a shaft mounted in bearings in said uprights, a permanent magnet carried by said shaft and forming the rotor of the magneto, said magnet being formed of one piece of tubular steel having cutaway portions forming spaced prongs magnetically connected at one end thereof and stationary cores carried by said non-magnetic upright, said cores being parallel, with one end of each core in a plane adjacent the path of travel of the ends of the prongs of the magnet, and a current generating coil on each core.

8. A magneto electric machine comprising a supporting base, uprights carried by said base, one of said uprights being of non-magnetic material, a shaft mounted in bearings in said uprights, a permanent magnet carried by said shaft and forming the rotor of the magneto, said magnet being formed of one piece of tubluar steel having cutaway portions forming spaced prongs magnetically connected at one end thereof and stationary cores carried by said non-magnetic upright, said cores being parallel, with one end of each core in a plane adjacent the path of travel of the ends of the prongs of the magnet, and a current generating coil on each core, and means whereby the stationary cores and coils may be angularly adjusted about the axis of the rotor.

In testimony whereof I hereunto affix my signature in the presence of two witnesses.

WILLIAM WARREN DEAN.

Witnesses:
   GEORGE R. CLOSE,
   DOROTHY J. TILLEY.